Feb. 24, 1942. H. N. STEPHAN 2,274,171
HORIZONTAL BORING AND MILLING MACHINE
Filed March 7, 1941 3 Sheets-Sheet 2

INVENTOR.
HALLIS N. STEPHAN
Kwis Hudson & Kent
ATTORNEYS

Feb. 24, 1942.  H. N. STEPHAN  2,274,171
HORIZONTAL BORING AND MILLING MACHINE
Filed March 7, 1941   3 Sheets-Sheet 3

INVENTOR.
HALLIS N. STEPHAN
BY Kwis Hudson & Kent
ATTORNEYS

Patented Feb. 24, 1942

2,274,171

UNITED STATES PATENT OFFICE 2,274,171

HORIZONTAL BORING AND MILLING MACHINE

Hallis N. Stephan, Cleveland Heights, Ohio, assignor to The Lucas Machine Tool Company, Cleveland, Ohio, a corporation of Ohio Application March 7, 1941, Serial No. 382,204

5 Claims. (Cl. 10—154)

The present invention relates to machine tools and more particularly to horizontal boring and milling machines.

The principal object of the present invention is the provision of a novel drive and feed for a horizontal boring machine spindle whereby threads can be exactly duplicated on either the same or successive pieces of work even though the operative connection between the drive and feed mechanisms is broken in the interim, thus permitting a thread cutting tool carried by the spindle to be rapid-traversed axially by a rapid-traverse mechanism and again fed along the same path or thread irrespective of whether the spindle is rotating or at rest or at what speed the spindle is rotating while it is being rapid-traversed.

Another object of the invention is the provision of a novel horizontal drilling and boring machine capable of exactly duplicating threads in the same or successive pieces of work and comprising spindle drive and feed mechanisms whereby the spindle can be rapid-traversed axially by a rapid-traverse mechanism and again fed along the same path or thread irrespective of whether the spindle is rotating or at rest or at what speed the spindle is rotating while it is being rapid-traversed.

The present invention resides in certain details of construction and combinations and arrangements of parts, and further objects and advantages thereof will be apparent to those skilled in the art to which the present invention relates from the following description of the preferred embodiment described with reference to the accompanying drawings forming a part of this specification and in which.

Figure 1:
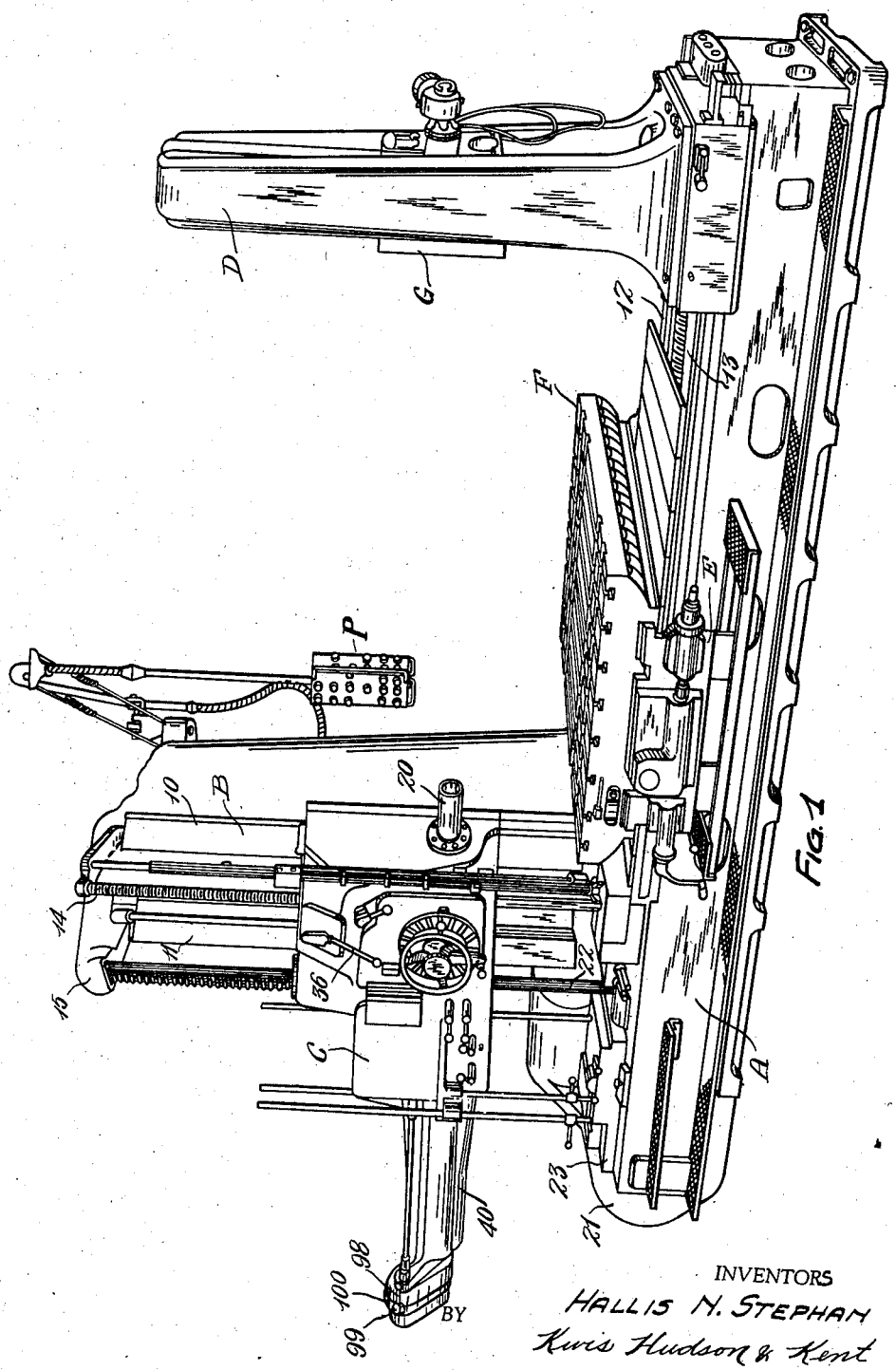
Fig. 1 is a perspective view of a horizontal boring and milling machine embodying the present invention.

The machine shown in the drawings comprises a base A provided at one end with a spindle head column B having vertical ways 10 and 11 on its front face and upon which a spindle head C is mounted for vertical movement. A backrest or outboard support column D is provided at the other end of the base or bed A, slidably supported on horizontal ways 12 and 13 formed on the upper side of the bed, which ways also slidably support the saddle E having ways thereon which in turn support the work table F. A backrest block G is slidably supported for vertical movement along ways formed on the backrest column D.

The spindle head C which is counterbalanced, as is common practice, by a weight, not shown, is adapted to be moved vertically along the ways 10 and 11 by a vertical lead screw 14 the lower end of which is rotatably supported in the base A while the upper end thereof is supported by a bracket 15 attached to the top of the spindle head column B. The threads of the lead screw 14 engage with a suitable nut, not shown, fixed in the spindle head. The tool spindle, designated generally by the reference character 20, is adapted to be driven and fed by a reversible drive and feed motor enclosed within a guard 21 at the left-hand end of the machine. The drive and feed motor is connected to the drive and feed mechanism in the spindle head by a vertical splined shaft 22 to the lower end of which the motor is operatively connected by speed change gearing located in a suitable gear box 23 supported in the base A.

The spindle 20 is slidably supported in a spindle quill 24 which is in turn rotatably supported in the spindle head C, and the upper end of the vertical drive shaft 22 is operatively connected to the spindle quill through back gears, designated generally by the reference character H, located in the spindle head. The back gears H include a gear cluster comprising the gears 25 and 26 splined on a shaft 27 the left-hand end of which, as viewed in Fig. 2, carries a bevel gear 28 in mesh with a bevel pinion 29 splined on the vertical shaft 22 so as to permit vertical movement of the spindle head. The gears 25 and 26 are adapted to be selectively meshed with the gears 30 and 31, respectively, of a gear cluster fixed to the spindle quill. To obtain a high speed drive the gear 26 can be meshed with a gear 32 on a shaft 33 which shaft is in turn connected to the spindle quill 24 by a flexible drive connection 35. The gear cluster comprising the gears 25 and 26 is adapted to be shifted along the shaft 27 by a hand lever 36 fixed to the forward end of a short shaft journaled in the spindle head, the rear end of which shaft carries a yoke member engageable with the gear cluster.

The machine thus far described is similar to that described in a copending application of H.

M. Lucas et al. Serial No. 243,616 filed December 2, 1938, entitled "Boring machine," and only those parts of the machine which are necessary to a complete understanding of the present invention are herein shown and described in detail.

The spindle 20 is adapted to be fed or rapid-traversed in either direction by a lead screw 39 rotatably supported in the spindle head extension 40 and having threaded engagement with a two-piece nut 41 located within the feed slide 42 adjacent to the left-hand end of the spindle 20 and connected thereto in a suitable manner. The lead screw 39 is adapted to be rotated in either direction and at different speeds by power derived from the spindle quill 24 through the medium of spur gears 43 and 44, the former of which is fixed to the left-hand end of the spindle quill while the latter is fixed to the right-hand end of a shaft 45 journaled in the spindle head and forming the driving shaft of a feed speed change transmisison, designated generally by the reference character K, housed within a suitable gear box in the spindle head. The gear 46 which forms the driving element of the feed change transmission K is operatively connected to a horizontal shaft 47 journaled in the spindle head through the medium of a gear 48 which forms the low speed element of an overrunning clutch transmission. In addition to being driven through the feed change transmission K, the shaft 47 is adapted to be selectively rotated at a high rate of speed in either direction by the reversible rapid traverse motor 49, which motor is operatively connected to the high speed element 50 of the overrunning clutch transmission.

Figure 3:
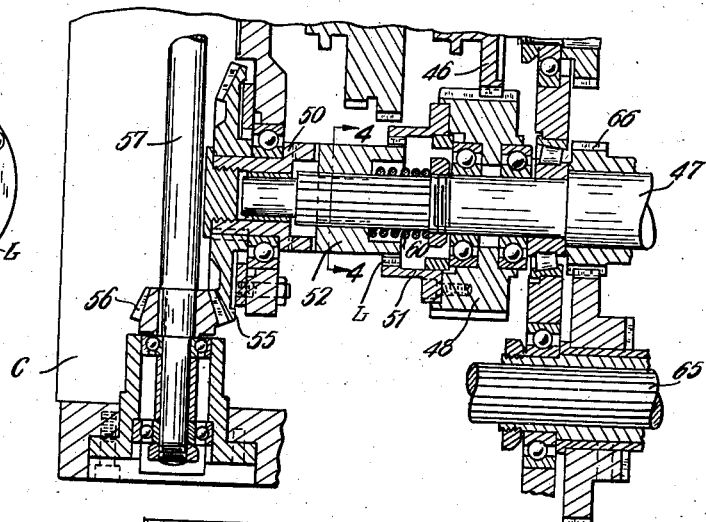
Fig. 3 is a horizontal sectional view through a portion of the spindle head.
Figure 5:
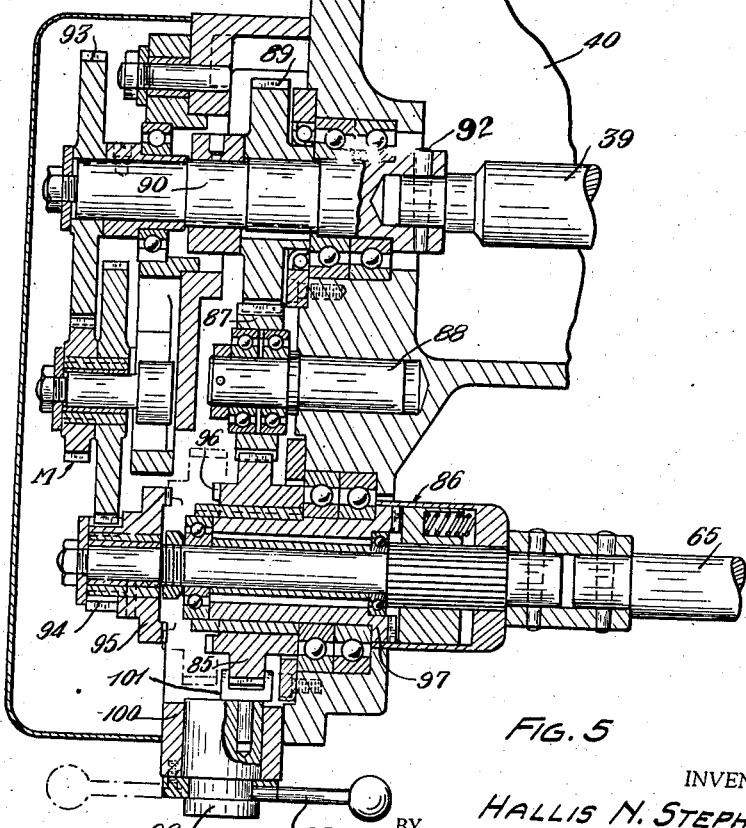
Fig. 5 is a view similar to Fig. 3 but through a different portion of the spindle head.

The gear 48 is rotatably supported on the shaft 47 and has fixed thereto the driving element 51, see Fig. 3, of a normally engaged toothed clutch L the driven element 52 of which is splined on the shaft 47. The left-hand end of the driven element 52 of the clutch L has a plurality of sloping teeth or cam surfaces 53 formed thereon which teeth cooperate with similar teeth 54 on the high speed driving member 50 formed integral with the hub of a bevel gear 55 rotatably supported on the shaft 47 and continuously in mesh with a bevel gear 56 fixed on the forward end of a shaft 57 connected to the armature shaft of the motor 49 by gears 58 and 59. The driven member 52 of the overrunning clutch transmission is continuously urged towards the left by a compression spring 60 interposed therebetween and an abutment on the shaft 47. The construction is such that the shaft 47 is normally connected to the feed change transmission K through the normally engaged clutch L and the gears 48 and 46, with the gear 55 rotating at the same speed as the shaft 47 due to the engagement of the teeth 53 and 54.

Upon energization of the rapid traverse motor 49, the gear 55 is rotated at a high rate of speed which is preferably much higher than the normal speed of the shaft 47. This difference in speed causes the teeth 53 of the slidable clutch element 52 to climb the teeth 54 of the high speed element 50, with the result that the slidable clutch element 52 is moved towards the right, disengaging the clutch L which in turn disconnects the low speed drive. Thereafter, the shaft 47 rotates at the same high speed as the gear 55. Movement of the member 52 towards the right is limited by the compression spring 60. The construction of the cooperating teeth 53 and 54 is such that they are never permitted to clear each other. Both sides of the teeth 53 and 54 are inclined so as to make the device operable for either direction of rotation of the motor 49. Upon deenergization of the motor 49, the spring 60 reengages the clutch L and reconnects the feed change transmission to the shaft 47 in place of the rapid traverse motor 49.

Figure 2:
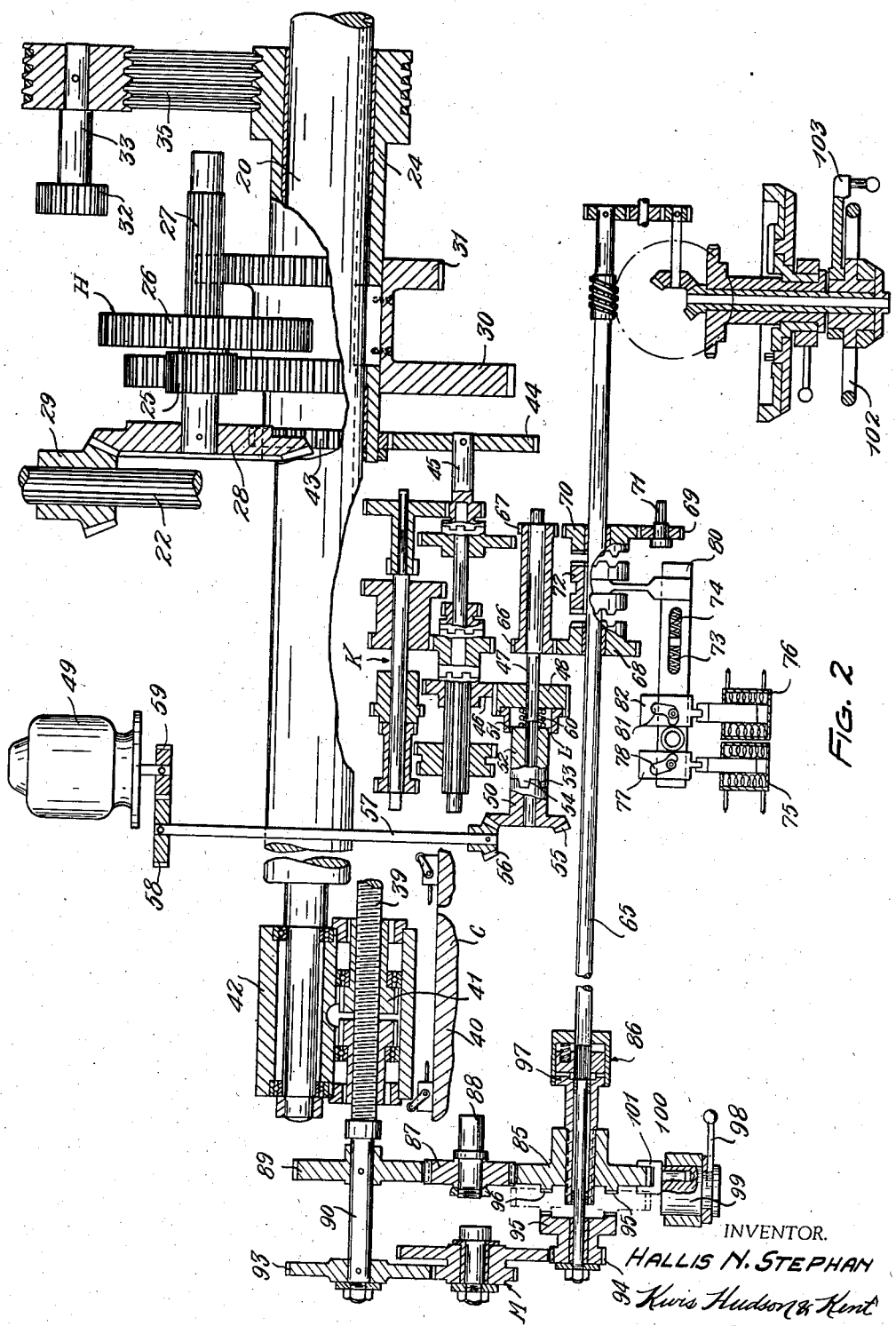
Fig. 2 is a diagrammatic view of that part of the gearing for rotating and reciprocating the spindle which is located in the spindle head.
Figure 4:
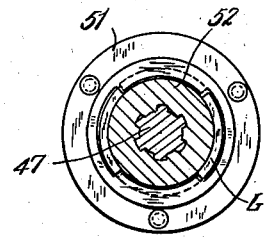
Fig. 4 is a sectional view on the line 4—4 of Fig. 3.

The shaft 47 is adapted to be operatively connected to a horizontal shaft 65 journaled in the spindle head and extending substantially the length thereof through the medium of a gear cluster comprising gears 66 and 67, the former of which is in mesh with a gear 68 journaled on the shaft 65 and the latter with a gear 69 which in turn meshes with a gear 70 also journaled on the shaft 65. The gear 69 is journaled on a jack shaft 71 and the gear 70 rotates in a direction opposite to the direction of rotation of the gear 68. Figure 2 is diagrammatic and 69 is shown at the opposite side of shaft 65 whereas actually it is underneath gears 67 and 70 and in mesh with both and gear 67 is not in mesh with gear 70. The gears 68 and 70 are adapted to be selectively connected to the shaft 65 by a shiftable clutch element 72 splined on the shaft 65 between the gears 68 and 70, opposite ends of which clutch element are provided with clutch teeth adapted to be engaged with similar clutch teeth formed on the adjacent sides of the gears. The clutch element 72 is normally maintained in an intermediate or neutral position by a pair of springs 73 and 74 but is adapted to be shifted towards the left to drive the shaft 65 from the gear 68 or towards the right to connect the gear 70 with the shaft 65 by electric solenoids 75 and 76, respectively.

The armature of the solenoid 75 is connected to a slidable member 77 provided with an inclined cam slot 78 within which a roller carried by a longitudinally slidable bar or rod 80 engages. The armature of the solenoid 76 is connected to the bar or rod 80 in a manner similar to that in which the armature of the solenoid 75 is connected thereto, except for the fact that the cam slot 81 in the member 82 corresponding to the member 77 is inclined in the opposite direction to the slot 78. The lower ends of the cam slots 78 and 81 are widened so that the operation of one of the members 77 and 82 will not be interfered with by the other. The slidable member 80 has a clutch yoke fixed to the right-hand end thereof which engages in a groove formed in the shiftable clutch member 72. The solenoids 75 and 76 correspond to solenoids 311 and 312 of the machine disclosed in said application Serial No. 243,616 and are preferably energized in the same manner.

The left-hand end of the shaft 65 is connected to a gear 85 through the medium of an automatic release overload clutch of conventional construction, designated generally by the reference character 86. The gear 85 is normally in mesh with a gear 87 journaled on a short shaft 88 fixed in the end of the spindle head extension 40. The gear 87 is in turn continuously in mesh with a gear 89 fixed to a short shaft 90 rotatably supported by anti-friction bearings in the end of the spindle head extension and operatively connected through the medium of a pin 92 to the left-hand end of the lead screw 39. When the machine is used for cutting screw threads, the lead screw 39 is preferably operatively connected to the shaft 65 by change gears, designated generally by the reference character M, the driven gear 93 of which is fixed to the shaft 90 while the driving gear 94 is rotatably supported on the reduced cylindrical left-hand end of the shaft 65.

The gear 94 is adapted to be selectively operatively connected to the shaft 65 by a tooth clutch the driven element 95 of which is fixed to the gear 94 while the driving element 96 is formed integral with the gear 85, which gear is splined on the driven member 97 of the automatic release overload clutch 86. The gear 85 is adapted to be shifted towards the left as viewed in the drawings by a manual shift lever 98 to engage the cooperating teeth of the clutch elements 95 and 96 and thus operatively connect the shaft 65 to the lead screw 39 through the medium of the change gears M. At the same time that the gear 85 is shifted to the left to engage the clutch comprising the elements 95 and 96, the gear 85 is moved out of mesh with the gear 87, thus disconnecting the drive between the shaft 65 and the lead screw 39 through the gears 87 and 89. The lever 98 is fixed to the forward end of a short shaft 99 rotatably supported in a bracket 100 fixed to the end of the spindle head extension. The rear end of the shaft 99 is provided with a yoke member 101 which engages over the gear 85.

The right-hand end of the shaft 65 is operatively connected to a spindle feed hand wheel 102, a crank 103, and fixed and adjustable dials, etc. This mechanism per se forms no part of the present invention and preferably is similar to that disclosed in the aforesaid application Serial No. 243,616.

In cutting threads with the machine shown, the movable clutch element 72 is shifted to operatively connect the gear 68 to drive the shaft 65 and the ratio of the feed change transmission K is so selected that there is a definite positive geared relation between the number of revolutions of the tool spindle 20 and the number of revolutions of the lead screw 39. Thereafter these parts must not be disconnected or changed so long as it is desired to duplicate any particular thread. The clutch L shown comprises two teeth, or, in other words, the clutch is engageable in one of two positions, in which event the ratio of the feed change transmission K is so selected that the tool spindle 20 makes one revolution for each one-half revolution of the gear 48. The tool will always be engaged at the same position in relation to the cut no matter in which of the two positions the clutch L engages. It is to be understood that the clutch L may be so constructed as to have one or more engageable positions and as the number of engageable positions varies, the ratio selected by the feed change transmission K must be changed accordingly.

After a thread has been cut, the spindle is returned to a position clear of the work, by first retracting the tool, that is moving the tool clear of the work, after which the rapid-traverse motor 49 is energized to rotate the lead screw 39 in the reverse direction and at a high rate of speed. Upon energization of the rapid-traverse motor 49 the cam teeth 53 and 54 will slide the driven element 52 of the clutch L out of engagement with the driving element 51, and since the driven element 52 is splined to the shaft 47 the spindle will be returned to starting position or to a position clear of the work, as the case may be, at a rapid-traverse rate. When the rapid-traverse motor is stopped, the normal feed will be re-engaged at the same position in relation to the thread as it occupied prior to the rapid-traverse movement.

It will be apparent from the foregoing that the feed will be re-engaged automatically at the same position in relation to the thread as it occupied prior to the rapid-traverse movement irrespective of the direction in which the rapid-traverse movement is effected. In other words, with the present construction the tool spindle can be rapid-traversed to bring the tool up to the work as well as to return the tool to a position clear of the work.

As will be apparent to those skilled in the art to which the present invention relates the machine illustrated includes various operations and movements other than those specifically referred to herein. Except for the differences pointed out herein, the machine shown is similar to the machine shown in the aforementioned application Serial No. 243,616 and many of the operations are controlled from a pendant control station P similar to that disclosed in said application.

From the foregoing description of the preferred embodiment of the invention, it will be apparent that the objects heretofore enumerated and others have been accomplished and that there has been provided a novel horizontal boring and milling machine capable of exactly duplicating threads in the same or successive pieces of work and in which the spindle can be returned to starting position or to a position clear of the work, as the case may be, after cutting a thread at a rapid-traverse rate without regard to whether or not the spindle is rotating or the speed at which the spindle is rotating. While the preferred embodiment of the invention has been described in considerable detail, the invention is not limited to the particular construction shown which construction may be varied without departing from the present invention as will be readily understood by those skilled in the art to which the invention relates.

Having thus described my invention, what I claim is:

1. In a horizontal boring and milling machine of the character described, the combination of a vertically movable spindle head, a horizontal tool spindle rotatably supported in said spindle head, means for rotating said tool spindle, power means for moving said tool spindle axially, said last-named means comprising a normally engaged toothed clutch and means for rotating the driving element of said clutch at a relatively slow speed which speed is equal to the speed of the tool spindle divided by the number of alternative positions in which the clutch may be engaged, means for disengaging said clutch, a second means for moving said tool spindle axially, and means for again engaging said clutch.

2. In a horizontal boring and milling machine of the character described, the combination of a vertically movable spindle head, a horizontal tool spindle rotatably supported in said spindle head, means for rotating said tool spindle, means for moving said tool spindle axially, said last-named means comprising a normally engaged toothed clutch and means for rotating the driving element of said clutch at a relatively slow speed which speed is equal to the the speed of the tool spindle divided by the number of alternative positions in which the clutch can engage, means for moving said tool spindle axially at a relatively fast speed, means for automatically disengaging said clutch upon actuation of the last-named means, and means for again engaging said clutch upon deenergization of said means.

3. In a horizontal boring and milling machine of the character described, the combination of a vertically movable spindle head, a horizontal tool spindle rotatably supported in said spindle head, means for rotating said tool spindle, means including a normally engaged toothed clutch for moving said tool spindle axially, means for driving one element of said clutch at a relatively slow speed which speed is equal to the speed of the tool spindle divided by the number of alternative positions in which the clutch can engage, means including an electric motor for moving said tool spindle axially at a relatively fast speed, means for automatically disengaging said clutch upon actuation of said electric motor, and means for again engaging said clutch automatically upon deenergization of said electric motor.

4. In a horizontal boring and milling machine of the character described, the combination of a vertically movable spindle head, a horizontal tool spindle rotatably supported in said spindle head, means for rotating said tool spindle, means including a normally engaged toothed clutch for moving said tool spindle axially, means for driving one element of said clutch at a relatively slow speed which speed will be equal to that of the spindle divided by the number of alternative positions in which the clutch can engage, means including a reversible electric motor for moving said tool spindle axially at a relatively fast speed, means for automatically disengaging said clutch upon actuation of said electric motor, and means for again engaging said clutch automatically upon deenergization of said electric motor.

5. In a horizontal boring and milling machine of the character described, the combination of a vertically movable spindle head, a horizontal tool spindle rotatably supported in said spindle head, means for rotating said tool spindle, means including a normally engaged toothed clutch having two alternative engageable positions for moving said tool spindle axially, means for driving one element of said clutch from said tool spindle at one-half the spindle speed, means including an electric motor for driving the other of said clutch elements at a relatively fast speed, means for automatically disengaging said clutch upon actuation of said electric motor, and means for again engaging said clutch automatically upon deenergization of said electric motor.

HALLIS N. STEPHAN.